(12) United States Patent
Tai

(10) Patent No.: US 6,581,215 B1
(45) Date of Patent: Jun. 24, 2003

(54) STERILIZING AND AIR CONDITIONING ELECTRONIC URINAL

(76) Inventor: Kuo-Cheng Tai, No. 183, Lane 226, San Lin Duan, Chung Cheng Rd., Lung-Tan Country, Tao-Yuan Hsien (TW)

( * ) Notice: Subject to any disclaimer, the term of this patent is extended or adjusted under 35 U.S.C. 154(b) by 509 days.

(21) Appl. No.: 09/632,167

(22) Filed: Aug. 3, 2000

(51) Int. Cl.[7] .............................................. E03D 13/00
(52) U.S. Cl. ....................... 4/304; 4/302; 4/305; 4/309; 4/DIG. 3; 261/DIG. 75
(58) Field of Search ........................... 4/301–305, 309, 4/222, DIG. 3; 261/DIG. 42, DIG. 75; 700/14

(56) References Cited

U.S. PATENT DOCUMENTS

| | | | | |
|---|---|---|---|---|
| 3,434,164 A | * | 3/1969 | Forbes | 4/304 |
| 4,984,314 A | * | 1/1991 | Weigert | 4/304 |
| 5,251,872 A | * | 10/1993 | Kodaira | 4/305 |
| 5,680,658 A | * | 10/1997 | Ho | 4/301 |

FOREIGN PATENT DOCUMENTS

TW 341974 * 1/1998

* cited by examiner

*Primary Examiner*—Tuan N. Nguyen
(74) *Attorney, Agent, or Firm*—Rosenberg, Klein & Lee

(57) ABSTRACT

A sterilizing and air conditioning electronic urinal includes a power rectifier circuit, a microcomputer control unit, a sensitivity control circuit, time delay circuit, a high voltage generating circuit, an ozone generator, a mixing device, a flushing solenoid valve circuit, an heater, an air pump circuit, and others. By aforesaid components, the electronic urinal can be operated with the internal program of the microcomputer control unit and therefore, the objects of water-saving and foul-removing are achieved.

2 Claims, 3 Drawing Sheets

STERILIZING AND AIR CONDITIONING ELECTRONIC URINAL

FIELD OF THE INVENTION

The present invention relates to a sterilizing and air conditioning electronic urinal, and especially to an intellectual electronic urinal.

BACKGROUND OF THE INVENTION

In a prior art sterilizing and air conditioning electronic urinal, for example, Taiwan Patent Publication No. 341974, an automatic sensing flushing device is installed with an ozone generator and an adjusting button for controlling the output of ozone. The ozone generator includes a high frequency high voltage circuit, an air compressor, an ozone generator, a control switch, and other element.

The high frequency high voltage circuit is connected to the ozone generator and the air compressor. The high frequency high voltage circuit cause the ozone generator to discharge in a high frequency and high voltage and meanwhile cause the air compressor is operated in a low frequency to pump air into the ozone generator.

The air compressor serves to compress air into the ozone generator. The air compressor is incorporated into the ozone generator for being operated in a low frequency for driving a low frequency magnetic oscillating reactive device so that a coil has a magnetic phenomenon and thus an oscillating air compressor is actuated.

The ozone generator is formed by an inner discharging tube, an outer discharging tube, and an edge insulating input and output cover. The inner discharging tube is a tube with filler therein for impedance matching. The center thereof is added with an electrode rod which is fixed to a head by an insulator and leads out the electrode to be connected to the high frequency high voltage circuit. The outer discharging tube is a metal hollow tube. The electrode thereof is connected to the high frequency high voltage circuit. Tow ends of the outer discharging tube is sealed by the insulating input and outer covers so that one end thereof is an input end and the other is an output end.

A control switch is installed at the exterior of the automatic sensing flushing device, which has the function of time adjusting, switching and amount of output ozone adjusting.

However, this prior art electronic urinal needs an external switch to control the amount of output water and ozone. The convenience in operation is reduced. Moreover, the water output and timing for outputting ozone can not be controlled by an identical signal, i.e., the two action are performed in the same time, therefore, water is wasted and foul-removing effect is not good, Another, an urinal flushing control structure is designed, such as that disclosed in U. S. Pat. No. 5,680,658, which includes a three-way pipe having a first end connected to a water intake pipe, a second end connected to a water outlet pipe through a mixing cylinder, and a third and in the middle mounted with a spring supported ball valve is drawn inwards by a vacuum suction force when water is discharged from the water intake pipe to he water output pipe to open the passage between the third end of the three-way pipe and the ozonizer, permitting ozone to flow from the ozonizer into the three-way pipe for mixing with water passing therethrough.

However, when it is driven by water to the mixing cylinder, the ozone and water are outputted at the same time, therefore, the output water and timing for generating ozone can not be controlled individually. Therefore, the water-saving and foul-removing effects can not be achieved effectively.

SUMMARY OF THE INVENTION

Accordingly, the primary object of the present invention is to provide an intellectual electronic urinal, wherein an identical signal is used to control the water output and ozone generating time (the timing of the two actions are different) so as to achieve the objects of water-saving and foul-removing.

Another object of the present invention is to provide a human machine interface electronic urinal, wherein the units in an automatic sensing flushing device are used with a microcomputer control unit, through the operations of the internal program of the microcomputer control unit, amount of output water and time for generating ozone are controllable. The foul removing effect can be preferred according to the use thereof.

The various objects and advantages of the present invention will be more readily understood from the following detailed description when reading in conjunction with the appended drawing.

DETAILED DESCRIPTION OF THE PREFERRED EMBODIMENTS

Figure 1:
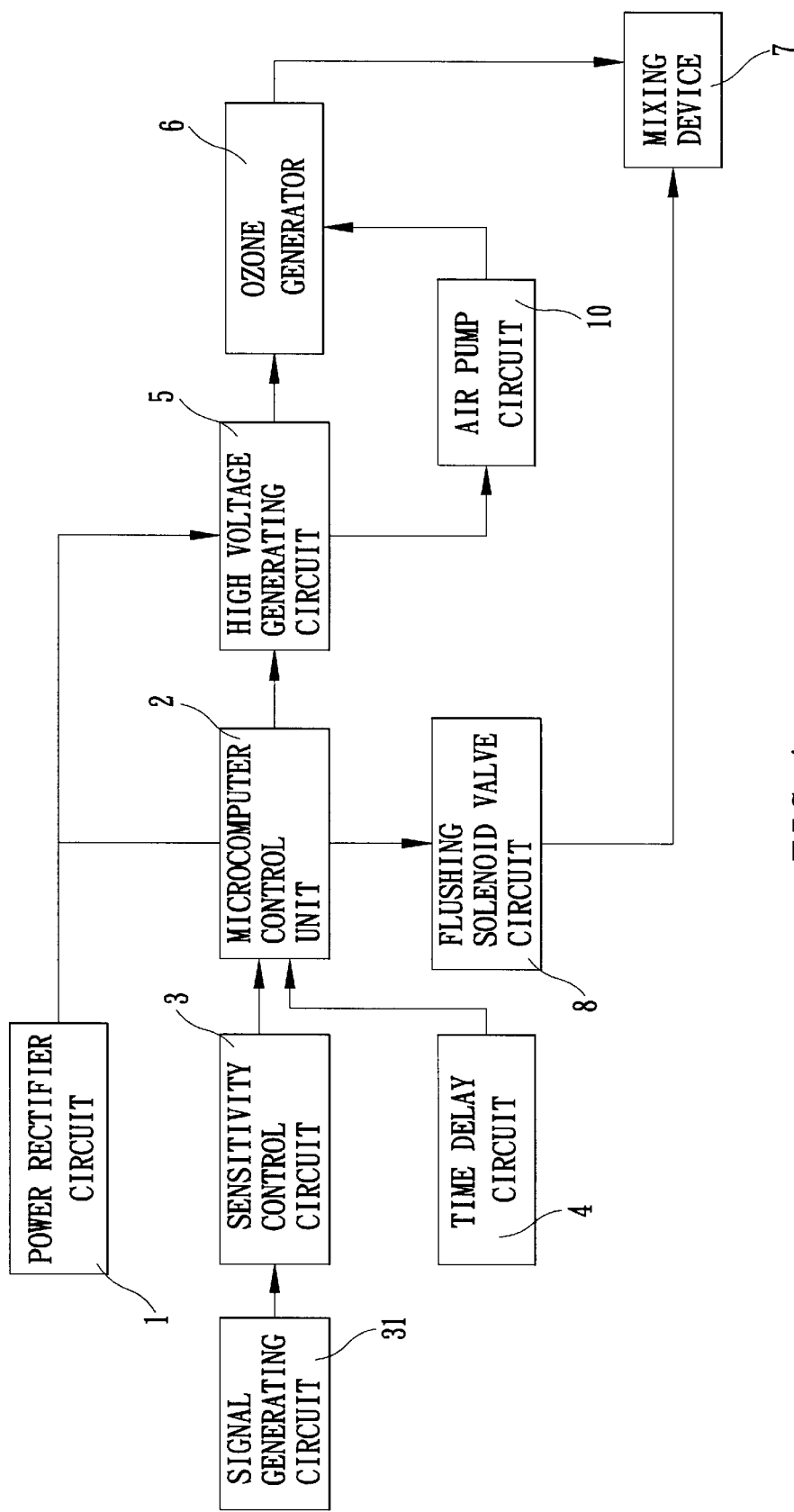
FIG. 1 is a circuit block diagram of the present invention.
Figure 2:
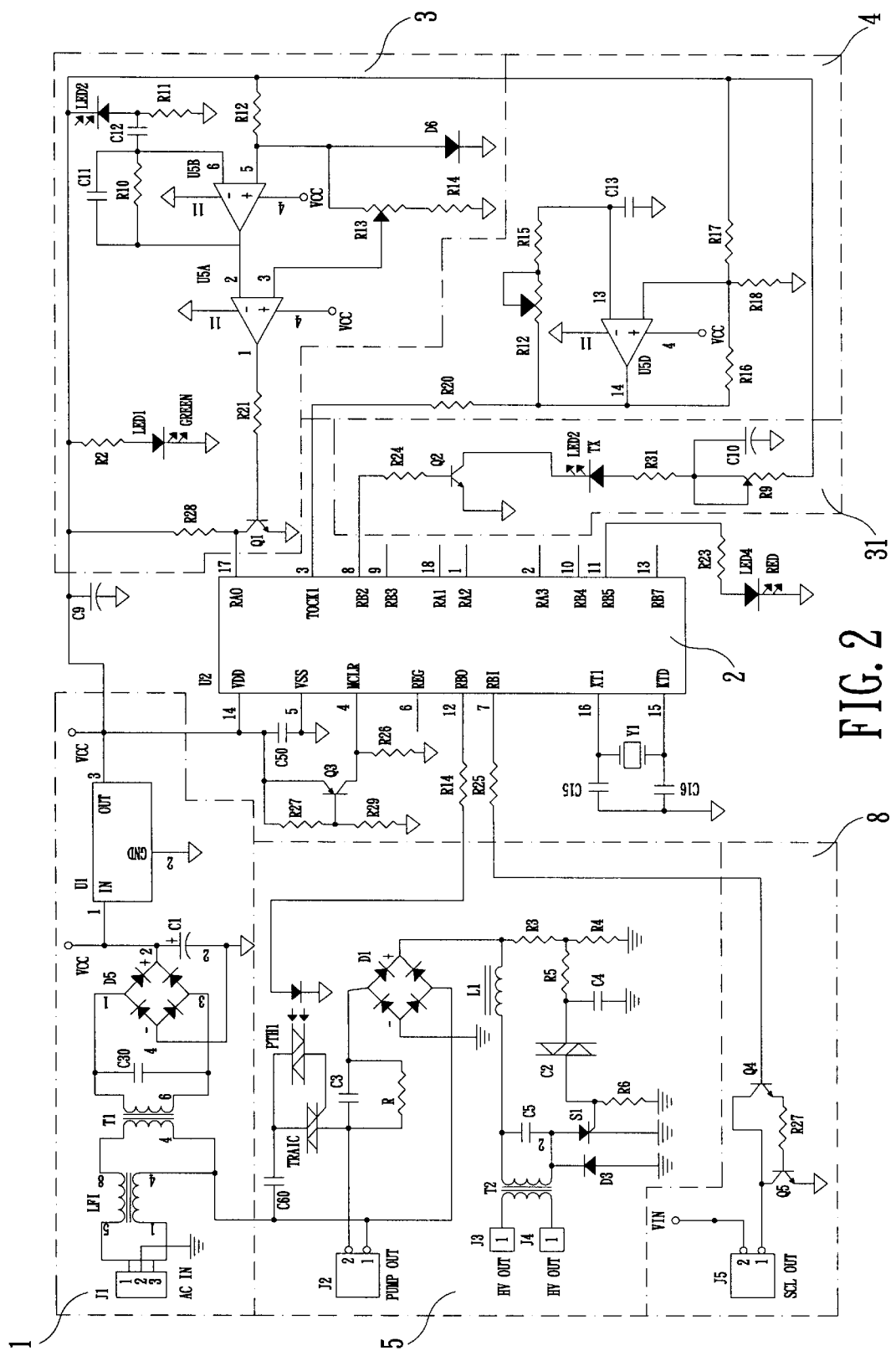
FIG. 2 is a circuit diagram of the present invention.

Referring to FIGS. 1 and 2, the sterilizing and air conditioning electronic urinal of the present invention is illustrated. The sterilizing and air conditioning electronic urinal according to the present invention includes a power rectifier circuit 1, a microcomputer control unit 2, a sensitivity control circuit 3, a time delay circuit 4, a high voltage generating circuit 5, an ozone generator 6, a mixing device 7, a flushing solenoid valve circuit 8, an air pump circuit 10, and others.

The power rectifier circuit 1 is formed by connecting a transformer T1, a bridge rectifier D5, a regulating IC U1, a capacitor C1, C3 . . . , and other elements. The power rectifier circuit serves to rectify the input AC current, filtering and regulating for acquiring a DC current for supplying working power to each circuit unit.

The sensitivity control circuit 3 is connected to the microcomputer control unit 3 formed by a microcontroller U2, a transistor Q3, resistors R14, R25, capacitors C15, C16, quartz an oscillator Y1, a red diode LED4, . . . , and other elements. The sensitivity control circuit 3 is formed by operational amplifiers U5A, U5B, a transistor Q1, resistors R10, R21, a capacitor C11, a green diode LED1, a variable resistor R13, and other elements. The variable resistor R13 may serve to adjust the sensitivity of the sensing light. The input of the sensitivity control circuit 3 is connected to a signal generating circuit 31 formed by a transistor Q2, a resistor R31, a capacitor C1, . . . , and other elements. When in a certain distance, if the urinal can not be sensed, the signal generating circuit 31 inputs the sensed signal to the input positive (+) end of the operational amplifier U5B for comparing with the voltage of the input negative (−) end. The output triggers the transistor Q1 through the operational amplifier U5A for actuating the microcomputer control unit 2.

The time delay circuit 4 is connected to the microcomputer control unit 2 and is formed by an operational amplifier U5D, resistors R15–R18, a capacitor C13, a variable resistor R12, . . . , and other elements. The variable resistor R12 serves to adjust the flushing time. the operational amplifier U5D of the time delay circuit 4 serves to compare the voltage of the input positive (+) end with the input negative (−) end. Then, the compared signal is input to the microcomputer control unit 2. Then, the microcomputer control unit 2 will work according to the microcomputer control unit 2.

The high voltage generating circuit 5 is connected to the microcomputer control unit 2 and is formed by an photo coupler PTH1, a triac TRIAC, a rectifier D1, resistor R3–R6, capacitors C3, C5, transformer T2, a silicon control rectifier S1, and other elements. The output end thereof is connected to the ozone generator 6. The high voltage generating circuit 5 serves to cause the ozone generator 8 to discharge in high voltage according to the time sequence outputted from the microcomputer control unit 2.

The air pump circuit 10 is connected to the cathode end of the triac of the high voltage generating circuit 5. The air pump circuit works as the microcomputer control unit 2 drives the high voltage generating circuit 5 to work for compressing air into the ozone generator 5.

The flushing solenoid valve circuit 8 is connected to the microcomputer control unit 2. The flushing solenoid valve circuit 8 operates according to the time sequence outputted from the microcomputer control unit 2.

The mixing device 7 is connected to the water outlet of the flushing solenoid valve circuit 8 and output of the ozone generator 6. The mixing device 7 serves to mix the water outputted from the flushing solenoid valve circuit 8 with the ozone outputted from the ozone generator 6.

The heater 9 is connected between the air pump circuit 10 and mixing device 7. The heater 9 heats the water to a proper temperature so that the urinal may be used in a low temperature environment.

When the signal generating circuit 31 does not sense the use of a urinal in a predetermined distance. The sensitivity control circuit 3 has an operational amplifier U5B serving to comparing the input positive (+) end with the input negative (−) end. Then, the compared signal is used to trigger the transistor Q1 to conduct through the operational amplifier U5A for actuating the microcomputer control unit 2. The microcomputer control unit 2 will operate according to the internal program for driving the high voltage generating circuit 5 and the flushing solenoid valve circuit 8 to work so that the ozone outputted from the mixing device 7 and output water may be sent out according to a preset time sequence (about 3~5 seconds), and then stops.

Then, if the user still remains nearby the urinal so that the signal generating circuit 31 senses that no one uses the urinal. The microcomputer control unit 2 will work according to the output signal of the time delay circuit 4. Thereby, the operation of internal program drives the high voltage generating circuit 5 and flushing solenoid valve circuit 8 to work so that the ozone outputted from the mixing device 7 and output water may be sent out according to a preset time sequence (about 10~60 seconds).

If in the delayed time, one uses the urinal, and the signal generating circuit senses the condition, then the microcomputer control unit 2 will cause the mixing device 7 to output ozone and water according to the internal operation program. Then, the ozone and water can be sent out according to the preset time (about 3~5 seconds). Therefore, the objects of water-saving and foul-removing are achieved.

The use of the present invention (program process) will be described in the following:

1. When power is conductive, the green LED (LED 1) lights up, while red LED (LED4) extinguish.
2. When a user is near the urinal, the red LED lights up about 1~1.5 second. If the user remains near the urinal, then the first stage operation is actuated (the operational mechanism has a flushing solenoid valve, an air pump and an ozone generator).
3. The first stage operation performs about 1~2 seconds. If the user remains near the urinal, the red LED still lights up.
4. If the user does not walk away, the first stage operation stops, red LED lights up, and a timer actuates to count the staying time.
5. When the staying time is not over 3 seconds, the second stage operation is not actuated, the red LED extinguishes, and the system returns to the initial standby state.
6. If the staying time is over 3 seconds, the standby process in second stage operational program is actuated. If the user walks away, the second stage operational program is actuated (the operation means include a flushing solenoid valve, an air pump, and an ozone generator), and the red LED extinguishes.
7. During the second stage operational program, if an user walks near the urinal, and the staying time is over 3 seconds, then the second stage operational program is stopped, the system returns to the first stage operation for stopping the operation, counting the staying time and standing by,
8. When the user near the urinal is complete the process, the second stage operational program is actuated until the program is over and returns to the initial stand by condition.
9. If the walking of peoples are detected, if the detecting time is not over 3 second, then the system has no response and continues the second stage operational program until the program returns to the initial standby condition.

Figure 3:
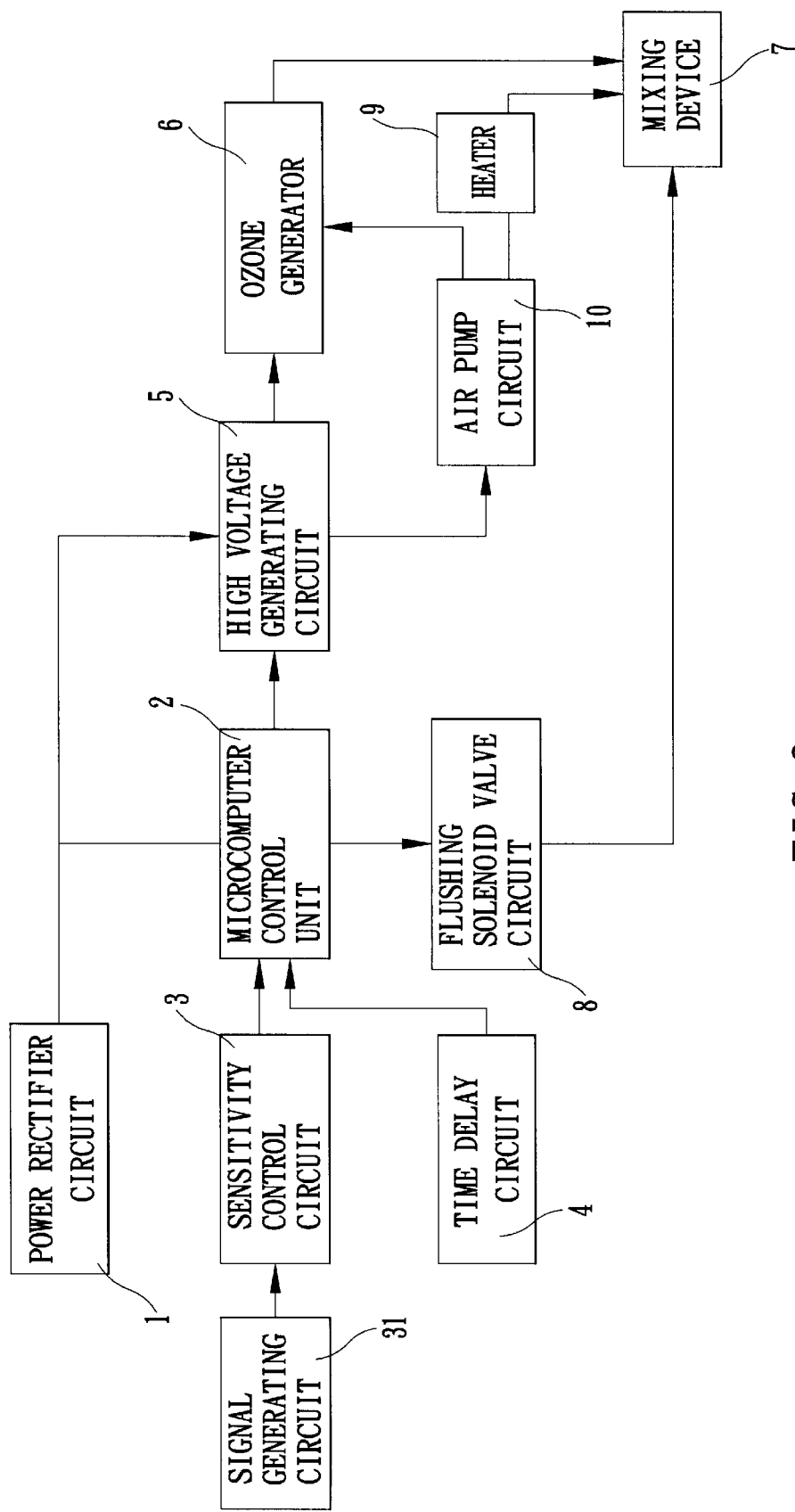
FIG. 3 is another circuit block diagram of the present invention.

Referring to FIG. 3, in the present invention, a heater can be installed between the air pump circuit 10 and the mixing device 7. The heater 9 serves to heat the output water to a proper temperature so that the urinal is usable in low temperature.

In summary, by the present invention, electronic urinal is used with an operation program in an microcomputer control unit for controlling water output and ozone generating time so as to achieve the objects of water saving and foul removing.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A sterilizing and air conditioning electronic urinal comprising:

power rectifier circuit for rectifying input alternative voltage (AC voltage) and regulating the voltage for acquiring a direct voltage (DC voltage) for supplying power to each working unit;

a signal generating circuit for sensing whether an user uses a urinal;

a sensitivity control circuit having an input end connecting to the signal generating circuit; the sensitivity control circuit comparing an input signal with a sensing signal and outputting a compared signal when in a predetermined distance, the signal generating circuit can not sense whether any one is using the urinal;

a time delay circuit;

a microcomputer control unit being connected to outputs of the time delay circuit and sensitivity control circuit; according to the output signals of the time delay circuit and the sensitivity control circuit and the internal programs of the microcomputer control unit, the microcomputer control unit controlling an output of ozone and output of water;

a high voltage generating circuit being connected to an output of the microcomputer control unit; one output of the high voltage generating circuit being connected to an ozone generator; the high voltage generating circuit working according to the time sequence of the output of the microcomputer control unit so that the ozone generator discharges in a high voltage;

an air pump circuit being connected to the high voltage generating circuit; when the microcomputer control unit drive the high voltage generating circuit, the air pump circuit compressing air into the ozone generator;

a flushing solenoid valve circuit being connected to the output of the microcomputer control unit; the flushing solenoid valve circuit running according to an output time sequence of the microcomputer control unit; and a mixing device being connected to an water output tube of the flushing solenoid valve circuit and an output of the ozone generator; the mixing device serving to mix the water outputted from the flushing solenoid valve circuit and ozone from the ozone generator;

wherein by aforesaid components, amount of output water and time for generating ozone are controllable and the objects of water-saving and foul-removing are achieved.

2. The sterilizing and air conditioning electronic urinal as claimed in claim 1, wherein a heater is added between the air pump circuit and the mixing device.

* * * * *